Patented June 15, 1937

2,084,275

UNITED STATES PATENT OFFICE 2,084,275

WELD ROD

Anthony G. de Golyer, New York, N. Y., assignor to Vulcan Alloy Corporation, a corporation of Delaware No Drawing. Application July 6, 1936, Serial No. 89,243

2 Claims. (Cl. 219—8)

This invention relates to a new alloy steel and relates particularly to an alloy steel containing tungsten, chromium and carbon, as well as certain other essential alloy elements, which is particularly adapted for fusion by high temperature gas flame or an electric arc and deposition on solid metal of a weld, facing or the like, characterized by high hardness and high resistance to stress and deformation.

This application is a continuation in part of my co-pending application Serial No. 70,617, filed March 24, 1936, in which I disclosed an alloy comprising tungsten 4% to 7%, chromium 2% to 5%, carbon .30% to .90%, manganese .40% to .90%, silicon .20% to .80% and the balance substantially all iron. I have found that when the alloy containing these several elements is used only as a weld rod for the deposition of metal by any of the known fusion methods the percentages of certain of the essential components may be varied within different limits, as specified herein.

Several alloy compositions have heretofore been proposed for the application of welds having relatively high degrees of hardness, i. e. approximately 500 Brinell hardness numbers or higher. All of such compositions contain high percentages of alloy elements, together with at least 1% or more of carbon. Although weld metal deposited with such compositions has high hardness, the deposits are extremely brittle and consequently are not suitable for use on applications exposed to hammering or shock.

Cast manganese steel, containing some 12% to 14% manganese, has been extensively used for parts of equipment subjected to wear by abrasion and impact. Such manganese steel, as is generally known, must be subjected to suitable heat treatment in order to develop the desired physical characteristics. Properly heat treated castings of this alloy have a Brinell hardness of from 200 to 250. The hardness is increased to a maximum of approximately 450 Brinell when the heat treated alloy is subjected to cold working, i. e:, repeated hammering or impact.

It is a well known metallurgical fact that heat treated cast manganese steel is not well adapted to rebuilding or repair by welding; the principal reason being that the portions of the castings which are heated to elevated temperatures in the welding operation undergo a marked change of structure. In this manner the effect of prior heat treatment is entirely destroyed.

The object of this invention is to provide an alloy which possesses, in combination, better physical properties and characteristics than manganese steel or other heretofore known alloys intended as substitutes therefor; and which may also be readily repaired by welding with material of the same composition. Further, the alloy may be used in the form of a weld rod for refacing or reclamation of carbon steels and a large number of alloy steels.

I have found that an alloy composed principally, as follows: tungsten 3% to 10%, chromium 2% to 5%, carbon .30% to .90%, manganese .20% to 1.00%, silicon .20% to 1.00% and the remainder substantially iron, possesses relatively high hardness, high strength and is extremely resistant to deformation under impact. Furthermore, material of this composition is particularly suitable for deposition by welding by various means, and the metal so deposited has high hardness, e. g., from approximately 450 to 640 Brinell, and also has substantially the same high resistance to deformation and impact as material of the same composition which has been cast and subsequently mechanically worked, such as by rolling. Such welded deposits may be ground by means of a suitable medium but cannot be cut nor machined by high speed steel.

When used in the form of a weld rod, the alloy of this invention may, for example, be deposited by means of oxyacetylene welding. The hardness of such deposits, in the welded condition, ranges from 600 to 640 Brinell. After such deposits have been subjected to cold working or impact, the hardness usually shows an increase of from 30 to 50 Brinell numbers. The weld metal exhibits remarkable resistance to failure under repeated shock or impact.

The alloy of this invention may also be deposited by arc welding. When using this method I usually prefer to employ a flux in conjunction with the weld rod. The metal has a high degree of weldability and the deposits are exceptionally sound and homogeneous. The hardness of such arc welded deposits ranges from about 450 to 650 Brinell in the as welded condition. Deposits which have been subjected to cold work or impact show an increase in hardness of from 50 to 100 Brinell numbers. Furthermore, deposits of this alloy made by arc welding possess all of the advantageous physical properties and characteristics exhibited by welds made by other means.

The combined physical properties and characteristics of the alloy of this invention i. e., high hardness, high strength and high resistance to deformation under impact render it particularly valuable for many uses for which manganese steel and other alloys have heretofore been employed, for example, such as frogs, switch points, cross-overs and other railroad equipment; rock crusher jaws; excavating machinery, etc. I have further found that for many industrial purposes it is possible to have the major portion of equipment composed of inexpensive carbon steel and to face the surfaces exposed to extreme conditions of wear or deformation with welded deposits of the present alloy. Extensive tests proved that equipment so faced has, in general, longer service life than similar articles made entirely of manganese steel or other special alloys. Furthermore, such welded facings may be readily and economically repaired or rebuilt, with the same alloy, an indefinite number of times. Consequently, this alloy offers distinctive advantages of economy.

The essential components of my alloy are tungsten, chromium, carbon, manganese, silicon and iron. The principal constituent of the alloy is iron. The tungsten content should be between 3% and 10% and the chromium content between 2% and 5%. The other essential component elements are each present in effective amounts up to a maximum of approximately 1% of the total weight of the alloy. Specifically, I prefer to have the latter elements present within the following limits: carbon .30% to .90%, manganese .20% to 1.00% and silicon .20% to 1.00%. It will be understood that the alloy will usually contain minor amounts of phosphorus, sulphur and other impurities incidental to manufacture. The amounts of such impurities present should be within the maximum limits usually prescribed for alloy steels. I also wish to explain that vanadium may be present in amounts from approximately .15% to .75% but the inclusion of this element is in no way essential.

As a specific example, an alloy within the scope of this invention which I have found to be particularly suitable for the facing by welding of new or worn railroad track equipment is the following: tungsten 6%, chromium 3.25%, carbon .47%, manganese .74%, silicon .44%, and the balance iron, with the exception of fractional percentages of phosphorus and arsenic.

I claim:

1. A weld rod comprising a metallic composition containing tungsten 3% to 10%, chromium 2% to 5%, carbon, .30% to .90%, manganese .20% to 1.00%, silicon, .20% to 1.00%, and the balance substantially iron.

2. A weld rod comprising a metallic composition containing tungsten 3% to 10%, chromium 2% to 5%, carbon .30% to .90%, vanadium .15% to .75%, manganese 20% to 1.00%, silicon .20% to 1.00% and the remainder substantially iron.

ANTHONY G. DE GOLYER.